United States Patent
Basak et al.

(10) Patent No.: US 7,542,960 B2
(45) Date of Patent: Jun. 2, 2009

(54) INTERPRETABLE UNSUPERVISED DECISION TREES

(75) Inventors: Jayanta Basak, New Delhi (IN); Raghuram Krishnapuram, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 745 days.

(21) Appl. No.: 10/320,959

(22) Filed: Dec. 17, 2002

(65) Prior Publication Data

US 2004/0117336 A1 Jun. 17, 2004

(51) Int. Cl.
*G06F 9/44* (2006.01)
*G06N 7/02* (2006.01)
*G06N 7/06* (2006.01)
*G06F 17/30* (2006.01)

(52) U.S. Cl. .............................. 706/52; 700/7
(58) Field of Classification Search ................. 382/226; 706/52, 45–48, 20; 707/1, 3, 6, 7, 100–102
See application file for complete search history.

(56) References Cited

U.S. PATENT DOCUMENTS

| | | | | |
|---|---|---|---|---|
| 6,029,195 A * | 2/2000 | Herz | ............................ | 725/116 |
| 6,144,838 A * | 11/2000 | Sheehan | ...................... | 434/362 |
| 6,216,134 B1 * | 4/2001 | Heckerman et al. | ....... | 707/104.1 |
| 6,269,353 B1 * | 7/2001 | Sethi et al. | ..................... | 706/20 |
| 6,351,561 B1 * | 2/2002 | Iyengar | ....................... | 382/226 |
| 6,393,387 B1 * | 5/2002 | Adriaans et al. | .............. | 703/27 |
| 6,460,036 B1 * | 10/2002 | Herz | ............................ | 707/10 |
| 6,496,816 B1 * | 12/2002 | Thiesson et al. | .............. | 706/52 |
| 6,564,197 B2 * | 5/2003 | Sahami et al. | ................. | 706/55 |
| 6,675,164 B2 * | 1/2004 | Kamath et al. | ................. | 706/45 |
| 6,748,356 B1 * | 6/2004 | Beigi et al. | .................. | 704/245 |
| 2002/0133721 A1 * | 9/2002 | Adjaoute | ..................... | 713/201 |
| 2002/0167403 A1 * | 11/2002 | Colmenarez et al. | ......... | 340/541 |
| 2003/0061228 A1 * | 3/2003 | Kamath et al. | ............... | 707/102 |
| 2003/0065635 A1 * | 4/2003 | Sahami et al. | ................. | 706/48 |
| 2003/0149554 A1 * | 8/2003 | Lambert et al. | ................ | 703/2 |
| 2003/0233197 A1 * | 12/2003 | Padilla et al. | .................. | 702/20 |
| 2004/0117336 A1 * | 6/2004 | Basak et al. | ................... | 706/52 |
| 2005/0074806 A1 * | 4/2005 | Skierczynski et al. | ........... | 435/6 |

OTHER PUBLICATIONS

Sven Behnke and Nicolaos B. Karayiannis, "Competitive Neural Trees for Pattern Classification", IEEE Transactions on Neural Networks, vol. 9, No. 6, Nov. 1998.*

Gregor P. J. Schmitz, Chris Aldrich, and Francois S. Gouws, ANN-DT: An Algorithm for Extraction of Decision Trees from Artificial Neural Networks, IEEE Transactions on Neural Networks, vol. 10, No. 6, Nov. 1999.*

(Continued)

*Primary Examiner*—Joseph P. Hirl
*Assistant Examiner*—Benjamin Buss
(74) *Attorney, Agent, or Firm*—Gibb I.P. Law Firm, LLC

(57) ABSTRACT

An unsupervised decision tree is constructed, involving the data records or patterns that do not posses any class labels. The objective of clustering or segmenting the data set is to discover subsets of data records that possess homogeneous characteristics. In the context of clustering, namely grouping or segmenting data sets without any supervised information, an interpretable decision tree is recognized as beneficial in various contexts such as customer profiling, text mining, and image and video categorization.

9 Claims, 3 Drawing Sheets

OTHER PUBLICATIONS

Sven Behnke and Nicolaos B. Karayiannis, "Competitive Neural Trees for Pattern Classification", IEEE Transactions on Neural Networks, vol. 9, No. 6, Nov. 1998.*

Gregor P. J. Schmitz, Chris Aldrich, and Francois S. Gouws, ANN-DT: An Algorithm for Extraction of Decision Trees from Artificial Neural Networks, IEEE Transactions on Neural Networks, vol. 10, No. 6, Nov. 1998.*

A New Criterion in Selection and Discretization of Attributes for the Generation of Decision Trees, IEEE Transactions On Pattern Analysis And Machine Intelligence, vol. 19, No. 12, Dec. 1997.*

Bellot,P et. al. "Clustering by means of Unserpervised Decision Trees or Hierarchical and K-means-like Algorithm" RIAO2000 Conference Proceedings. 2000.*

Zeidler,J et. al. "Fuzzy Decision Trees and Numerical Attributes" IEEE. 1996.*

Kramer,S et. al. "Predication of Ordinal Classes Using Regression Trees" Fundamenta Informaticae XXI. 2001.*

Khoshgoftaar.T. "A Tree-Based Classification Model for Analysis of a Military Software System" IEEE. 1997.*

Goodman,R et. al. "Decision Tree Design from a Communication Theory Standpoint" IEEE. 1988.*

Buluswar,S et. al. "Non-parametric Classification of Pixels Under Varying Outdoor Illumination" ARPA94. 1995.*

Bellot,P et. al. "Clustering by means of Unserpervised Decision Trees or Hierarchical and K-means-like Algorithm" RIAO2000 Conference Proceedings. 2000.*

Jun,B.H. et. al. "A New Criterion in Selection and Discretization of Attributes for the Generation of Decision Trees" IEEE. 1997.*

Lambert,C.G. et al. "Fast Computer Data Segmenting Techniques" International Application Publication WO 02/23383 A1 for International Application No. PCT/US01/25519. Published Mar. 21, 2002.*

Jordan,M.I. "A Statistical Approach to Decision Tree Modeling" ACM. 1994.*

Hawkins,D.M. et al. "Analysis of a Large Structure-Activity Data Set Using Recursive Partitioning" 1997.*

Golden Helix ("HelixTree: Technology Review") Version from Apr. 28, 2001 from Archive.org accessed on Jul. 10, 2007.*

Lambert,C.G. et al. "Fast Computer Data Segmenting Techniques" International Application Publication WO 02/23383 A1 for International Application No. PCT/US01/25519. Published Mar. 21, 2002.*

Sukmarg,O. et al. "Fast Object Detection and Segmentation in MPEG Compressed Domain" IEEE. 2000.*

Russell,S. et al. "Artificial Intelligence: A Modern Approach" Chapter 18, pp. 525-562. ISBN: 978-0131038059. 1995.*

Sukmarg,O. et al. "Fast Object Detection and Segmentation in MPEG Compressed Domain" IEEE. 2000.*

Patrice Bellot and Marc El-Beze, Clustering by means of unsupervised decision trees or hierarchical and K-means like algorithms, RIAO 2000 Conference Proceedings, Paris France, Apr. 12-14, 2000, pp. 344 to 363.

Marcus Held and J. M. Buhmann, Unsupervised on-line learning of decision trees for hierarchical data analysis, Proc. Advances of the Neural information Processing Systems (NIPS 97), 1997.

Bing Liu, Yiyuan Xia, and Phillip S. Yu, Clustering through decision tree construction, IBM Research Report, RC 21695, 2000.

* cited by examiner

INTERPRETABLE UNSUPERVISED DECISION TREES

FIELD OF THE INVENTION

The present invention relates to interpretable unsupervised decision trees.

BACKGROUND

Decision trees are widely used as classification tools. One major advantage of decision tree are their interpretability that is, the decision can be interpreted in terms of a rule set. Interpretability, in this context, means that at every node of a decision tree, the branching decision is based upon the value of a single attribute, and the choice of the attribute is based upon a splitting criterion. The net result is that each leaf of the decision tree represents a cluster, and the path from the root to the leaf defines a rule that describes the cluster.

Hierarchical clustering involves first dividing a data set (consisting of a set of patterns) into a certain number of clusters at a relatively coarse level, then further segmenting each of these coarse clusters into relatively finer levels until a "stop" criterion is satisfied.

A similar clustering technique can also be conversely performed in a "bottom-up" manner. A large number of clusters at a fine level of resolution are clustered into broader categories at each successive level. In either case, each level represents a degree of resolution or coarseness.

Various existing clustering techniques are used to manage information. Bellot et al (in Patrice Bellot and Marc El-Beze, *Clustering by means of unsupervised decision trees or hierarchical and K-means like algorithms*, RIAO 2000 Conference Proceedings, Paris, France, Apr. 12-14, 2000, pp. 344 to 363) describe a decision tree provided for text categorization. Information about text clusters is used in conjunction with supervised information about whether a document is useful or not useful to a user. The total information content in the cluster of useful documents and in the cluster of non-useful documents is used to build a decision tree.

Held et al [Marcus Held and J. M. Buhmann, *Unsupervised on-line learning of decision trees for hierarchical data analysis*, Proc. Advances of the Neural Information Processing Systems (NEPS97), 1997] describe a decision tree or a hierarchy representing the clusters is provided based on minimization of a criterion function that is generally used for clustering using EM (expectation-maximization) and soft k-means (that is, fuzzy k-means) algorithms. The data set is divided into two clusters at each level in such a way that the division minimizes the criterion function. This technique is essentially a hierarchical form of an EM-based clustering algorithm. Thus, this technique provides a hierarchical clustering algorithm in which the first level clusters (two clusters) are formed at a relatively coarse resolution. Relatively finer resolution clusters are formed down the hierarchy.

Liu et al [Bing Liu, Yiyuan Xia, and Phillip S. Yu, *Clustering through decision tree construction*, IBM Research Report, RC 21695, 2000] describe injecting noisy data values into a data set. A decision tree is the provided by classifying the original data values and the noisy data values, by assuming that the original data values and the noisy data values belong to two respectively different classes. Although the objective is to build an unsupervised decision tree from the unlabelled data, the method for building a supervised decision tree has been applied here and the performance of this technique depends upon the amount of noisy data injected into the original data set.

In the above-described techniques, a binary decision tree is formed, rather than a generalized n-ary decision tree. In this case, n is the number of child nodes created at a node. Thus, n is a variable that depends on the type of the data at each node of every level of the decision tree.

Existing techniques provide hierarchical clusters in which each cluster level does not have any direct interpretability. In other words, in order to interpret a generated hierarchy, the clusters at each node need to be separately analyzed. Also, most of the existing techniques create a binary hierarchy rather than a generic n-ary decision tree. Accordingly, a need clearly exists for an improved manner of performing hierarchical clustering.

SUMMARY

An unsupervised decision tree is constructed, involving the data records or patterns that do not posses any class labels. The objective of clustering or segmenting the data set is to discover subsets of data records that possess homogeneous characteristics. In the context of clustering, namely grouping or segmenting data sets without any supervised information, an interpretable decision tree is recognized as beneficial in various contexts such as customer profiling, text mining, and image and video categorization.

At any given node, an attribute is selected in such a manner that, if clustering is performed solely based on that attribute, the resulting inhomogeneity is minimized. Thus, a direct interpretability can be achieved for the unsupervised decision tree in the context of clustering.

A set of patterns at a node is split, based on a certain criterion that is a function the individual attributes. If a splitting criterion is most highly satisfied for a certain attribute, then child nodes are created under the relevant node based upon that attribute, and one subset of patterns is allocated to each to the child nodes.

In the supervised decision tree, at any given node the attribute is selected in such a manner that if classification is performed based solely on that attribute, then the resulting impurity (that is, the amount of mixing of data from different classes) is minimized. Thus, a direct interpretability for an attribute at a node of the decision tree is achieved in the context of classification.

Interpretability, in this context, means that the branching decision at each node is determined by the value of a certain attribute or combination of a subset of attributes, and the choice of the attribute(s) is based on certain splitting criterion that satisfies the objective of the classification process. Consequently, each leaf node of the tree representing a class is interpreted by the path from the root node to that leaf node. The path can be explicitly described in terms of a rule such as "if $A\_1\$$ and $A\_2\$$ and $A\_3\$$ then class $C\_1\$$". Thus, a class structure is represented by a set of leaf nodes and consequently, a class can be described by a set of rules as coded in the intermediate nodes of the decision tree.

Accordingly, a supervised decision tree does not associate any direct interpretability of the clusters based on the attributes. In other words, to interpret the hierarchy of the existing algorithms, the clusters at each node need to be separately analyzed. Also, most of the existing methods create a binary hierarchy, and generalizing these methods to generate an n-ary decision tree with a variable n can be difficult.

An unsupervised decision tree that is interpretable in terms of rules involving the attributes of the patterns in the data set is presented herein.

In overview, a decision tree is constructed without any supervised information such as labels for patterns, so that the decision tree is interpretable directly in terms of the attributes of the data set. Each path from the root to a leaf node defined a rule in terms of the attributes, and each leaf node denotes a cluster. Various kinds of attributes can be accommodated, such as binary, numeric, ordinal, and categorical (nominal) attributes.

DETAILED DESCRIPTION

Techniques are described herein for constructing an interpretable decision tree. In summary, these techniques are used for:

(i) measuring the inhomogeneity at a given node of the unsupervised decision tree,
(ii) selecting the attribute that gives rise to maximum amount of inhomogeneity when clustering is performed solely based on the attribute, and
(iii) segmenting the patterns or data records under the node based on the attribute and assigning them to the resultant nodes.

Notation

Before proceeding further, a brief explanation is provided of notation use herein. Let DN be the set of patterns or data records available at a node N. Let each pattern $x_i$ be described by an n-dimensional vector $x_i=[x_{i1}, x_{i2}, \cdot c, x_{in}]$, where n is the number of attributes available at node N. Let the set of n attributes available at node N be denoted by $FN=\{f_1, f_2, \cdot c, f_n\}$.

Data Structure

A tree data structure is maintained to represent the unsupervised decision tree. To build the decision tree, all the nodes are explored "level-wise". That is, the nodes at the first level (the root node) are explored first, and the child nodes are created at the second level. Then, all nodes at the second level are explored to create child nodes of all nodes in the second level. Then, these child nodes are explored, and so on.

Consequently, the formation of the decision tree indexes the nodes in a breadth-first manner. One can also build the decision tree in a depth-first manner using the recursive procedural calls, if required.

Two data structures are used: (i) a list of nodes to represent the nodes to be explored at a certain level, and (ii) a tree data structure to store the decision tree. Initially, the tree data structure consists of only the root node. The list is updated for every level.

Algorithm

Figure 1:
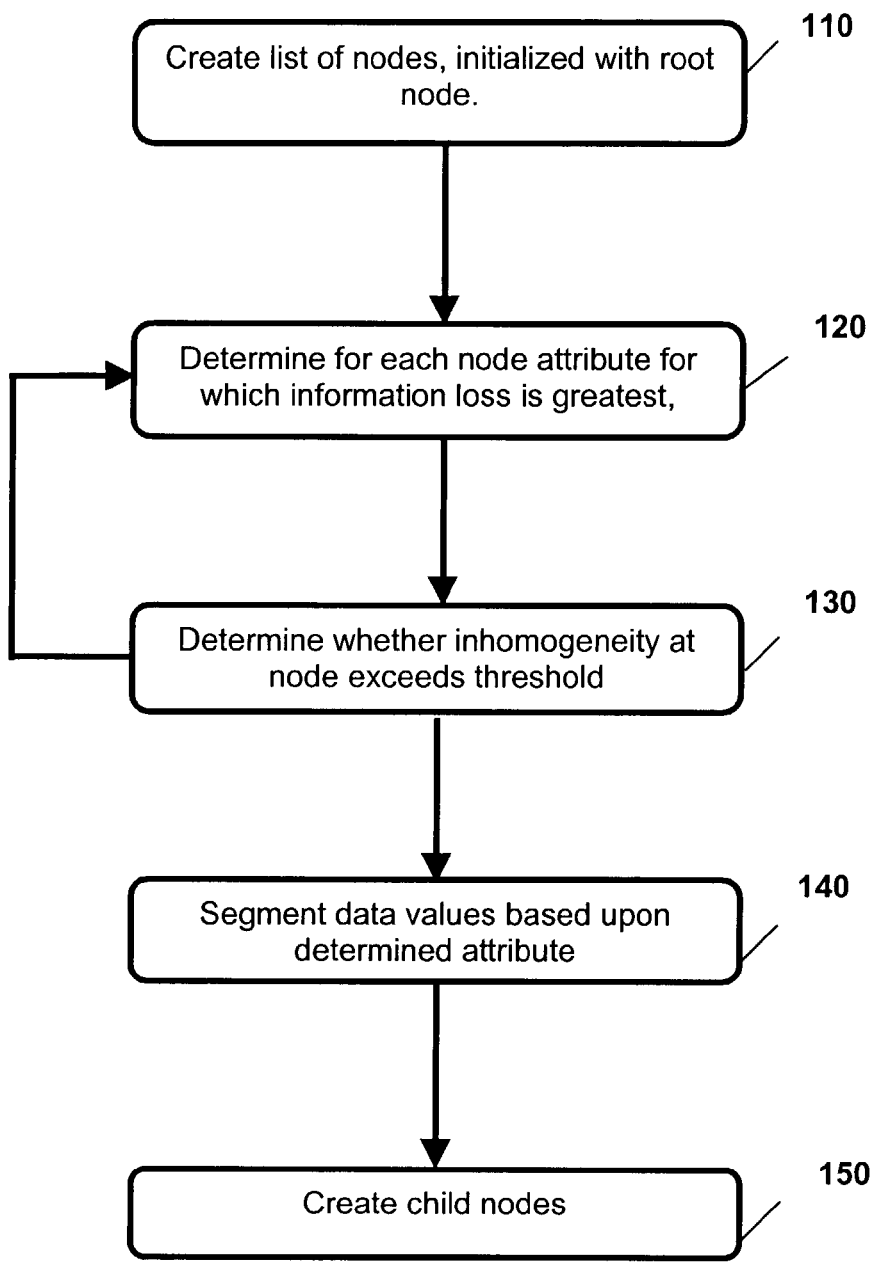
FIG. 1 is a flowchart representing a sequence of steps involved in an algorithm for constructing an interpretable decision tree.

The algorithm is explained as follows with reference to the steps 110 to 180 listed below. FIG. 1 flowcharts this sequence of steps.

110 Create a list L of nodes to be explored. Initialize L with the root node (for example, node number 1). The root node has all attributes and patterns available. Start with the initialized list L.

120 For every node in the list L, perform the following steps: Let a given node in the list L be N of the decision tree. Determine the feature or attribute (for example, $f_i$) in the set of attributes available to the node N (for example, FN) for which the information loss is maximum if that attribute is deleted from the list FN (that is, find the attribute that is most informative).

Information loss is measured in terms of the loss of inhomogeneity of the data set DN available to the node N. The information content is assumed to be minimum if the data set DN is totally homogeneous and the information content increases with the increase of inhomogeneity in the data set with respect to the attribute. The feature or attribute, thus selected, is interpreted as the deciding feature or attribute in the list of attributes at the given node.

130 Determine whether the inhomogeneity at the node with respect to one of the attributes, for example, $f_i$, is greater than a predetermined threshold (that is, if the data available to node N can be segmented). If the inhomogeneity determined is greater than the previously defined threshold, proceed to step 140. Otherwise, return to step 120. segment the data set DN based on the selected attributed $f_i$.

The segmentation described above is based on a single attribute, and can be performed in many different ways such as valley detection, K-means, and leader clustering. The algorithm used to perform segmentation based on a single attribute should be relatively fast for the unsupervised decision tree to be useful. This process partitions the set of patterns DN into, for example, KN segments. One method of partitioning the data into a suitable number of segments is described below.

150 If data records are segmented in step 140, create KN child nodes for the node N and assign each of the KN data segments created in step 140 to one child node. Allocate each child node the set of attributes $FN=\{f_i\}$. Add these child nodes to the new list for the next level (for example, L·f) if the set of attributes $FN=\{f_i\}$ is non-empty.

For example, if the data set DN is split into 3 segments DN1, DN2, and DN3 then 3 child nodes N1, N2, and N3 are created and allocated the data sets DN1, DN2, and DN3 respectively. Each child node is allocated a set of attributes which is the set available in the parent node minus the attribute based on which the data segmentation was performed. Each of the three child nodes is attributed a set of attributes $FN=\{f_i\}$. Update the decision tree data structure to store the hierarchical information that child nodes have been created for the node N.

160 Return to step 120 for the next node in the list L, if the list L is not empty. Update the decision tree data structure correspondingly. If the list L is empty, stop.

The data structure for the decision tree stores the hierarchy and the set of patterns available for each child node. Each leaf node represents a cluster. Starting from the root node, the structure stores the attribute information based on which the child nodes are created and this information imparts a direct interpretability of the unsupervised decision tree.

Segmentation

Figure 2:
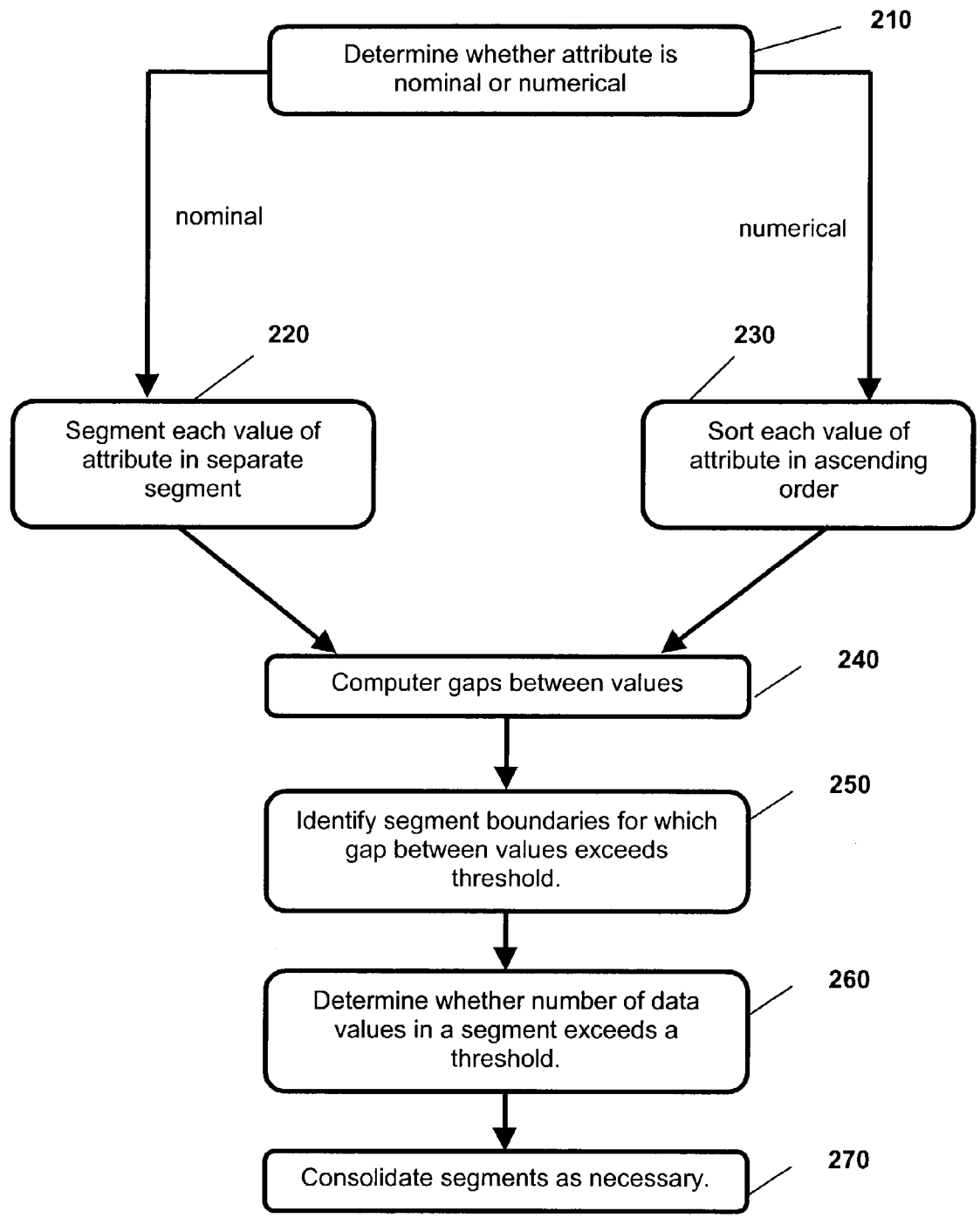
FIG. 2 is a flowchart representing a sequence of steps involved is segmenting data values in the algorithm represent in FIG. 1.

In one implementation, segmentation of the set of patterns in Step 140 is performed as described below with reference to the following steps 210 to 270. FIG. 2 flowcharts these steps 210 to 270.

210 Determine whether an attribute is nominal (that is, categorical), or numerical.

220 If the attribute is nominal or categorical, as determined in step 210, then patterns with each particular value of the attribute are placed in a separate segment. For example, if colour is the attribute then all patterns with a particular value for colour can be placed in one data segment. If there are KN possible values for the attribute, at most KN data segments or subsets are obtained.

230 If the attribute is numerical or ordinal, as determined in step 210, then for all patterns available at that node, sort the values of the selected attribute in ascending order.

240 Consider the sorted values (in ascending order) of the selected attribute for all data records. That is, the sorted list looks like $[v_1, v_2, v_3, \ldots, v_N]$ for N data records at a node, where $v_1 < v_2 < v_3 < \ldots < v_N$, in which $v_i$ is the attribute value for some data record j and takes the i-th position in the ascending sorted list. Compute the gaps between consecutive sorted values. That is, compute $v_2-v_1, v_3-v_2, v_4-v_3, \ldots, v_N-v_{N-1}$.

250 Identify segment boundaries for which the gap between two consecutive data values (for the chosen attribute) is more than a certain threshold. Thus, for a certain predetermined threshold of the gap, several segments of the attribute values (for example, KN segments) are generated.

The records or patterns in the data set are then divided in such a way that the patterns, having attribute values of the chosen attribute in the same segment of attribute value of the chosen attribute, fall into the same data segment. Thus, at most KN data segments are generated from the data set. If the threshold of the gap is small, a large number of segments is created and for a large threshold, few clusters are created.

260 Determine whether the number of data values in a cluster/segment is less than a certain predefined threshold

270 If the number of data values in a cluster/segment is less than a certain predefined threshold, as determined in step 260, then data in the cluster/segment is merged to the "nearest" cluster/segment.

Relative Importance

Determining the importance of an attribute (or inhomogeneity with respect to an attribute) at any node N is described in terms of loss of information in the data set if the attribute is dropped.

Let $\mu_{ij}$ be the degree of similarity of two data values xi and xj in the data set available at a given node N such that $\mu_{ij}=1$ indicates that $x_i$ and $x_j$ should belong to the same cluster, $\mu_{ij}=0$ indicates that $x_i$ and $x_j$ should belong to different clusters.

A value of $\mu_{ij} \in [0,1]$ indicates the degree of belief that the two data values $x_i$ and $x_j$ should belong to the same cluster. A simple way of formulating $\mu_{ij}$ is given in Equation (1) below.

$$\mu_{ij} = f\left(1 - \frac{d_{ij}}{d_{max}}\right) \quad (1)$$

In Equation (1) above, $d_{ij}$ is the distance $d(x_i, x_j)$ between the data values $x_i$ and $x_j$. This distance is not necessarily the same as the Euclidian distance. The parameter $d_{max}$ is the maximum distance between any pair of points in the data set DN. This parameter is specified below in Equation (1.1).

$$d_{max} = \max_{x_p, x_q \in D_N} \{d(x_p, x_q)\} \quad (1.1)$$

In Equation (1) above, the function f(.) is a monotone function (for example an S-function or a sigmoidal function). The distance $d_{ij}$ can also be normalized by some other factors (instead of $d_{max}$) such as the average distance $d_{av}$ between all pairs of data values available at that node, or some multiple or fraction of $d_{av}$ or $d_{max}$. If an attributed $f_a$ is dropped from the list of attributes then the distance $d_{ij}$ changes, and therefore the degree of similarity between a pair of data values changes.

Let the new degree of similarity between a pair of data values be denoted by a $\mu_{ij}$ which is computed exactly as in Equation (1) with a reduced dimensionality, that is, with the attribute $f_a$ dropped from the list. The measure of importance for the attribute $f_a$ is computed as the relative entropy given by Equation (2) below.

$$H_a = -\left(\sum_{i,j} \mu ij\left(1 - \mu \underset{ij}{a}\right) + \mu \underset{ij}{a}(1 - \mu ij)\right) \quad (2)$$

The relative entropy $H_a$ is computed (using Equation (2)) for all attributes $f_a$ and the attribute $f_k$ is selected for which this attribute is maximum. Thus, a single numerical value representing relative "importance" is obtained. The importance can be computed in many other ways such as the Kullback-Leibler divergence criterion (outlined with respect to Equation (3) below). The Kullback-Leibler divergence criterion is applicable if the distances between the pair of data values are described in terms of a probability distribution p(d) and $p(d_a)$ where d represents the distance between a pair of points in the original attribute space (that is, in the space of attributes available to node N) and $d_a$ is the distance the space of attributes with the attribute $f_a$ omitted.

$$H_a = -\int p(d) \log\left(\frac{p(d)}{p(d^a)}\right) \delta d \quad (3)$$

A discretized version for computing the Kullback-Leibler divergence is presented as Equation (4) below.

$$H_a = -\sum_s h(d) \log\left(\frac{h(d)}{h_a(d^a)}\right) \quad (4)$$

In Equation (4) above, h(d) and $h_a(d^a)$ are the normalized histograms of the distances d and $d^a$ between pair of points. The summation is computed over all slots in the histogram.

Instead of computing the loss of information while dropping an attribute from the list, the gain in information can also be computed while an attribute is considered alone. In that case, the importance of an attribute is computed as presented in Equation (5) below.

$$H_a = -\sum_{i,j} \mu \underset{ij}{a}\left(1 - \mu \underset{ij}{a}\right) \quad (5)$$

In Equation (5) above, $\mu_{ij}^a$ indicates the degree of similarity between two data values $x_i$ and $x_j$ considering the attributed, $f_a$ that is, the distance between the data values $x_i$ and $x_j$ is measured only in terms of the attributed $f_a$.

Computer Hardware and Software

Figure 3:
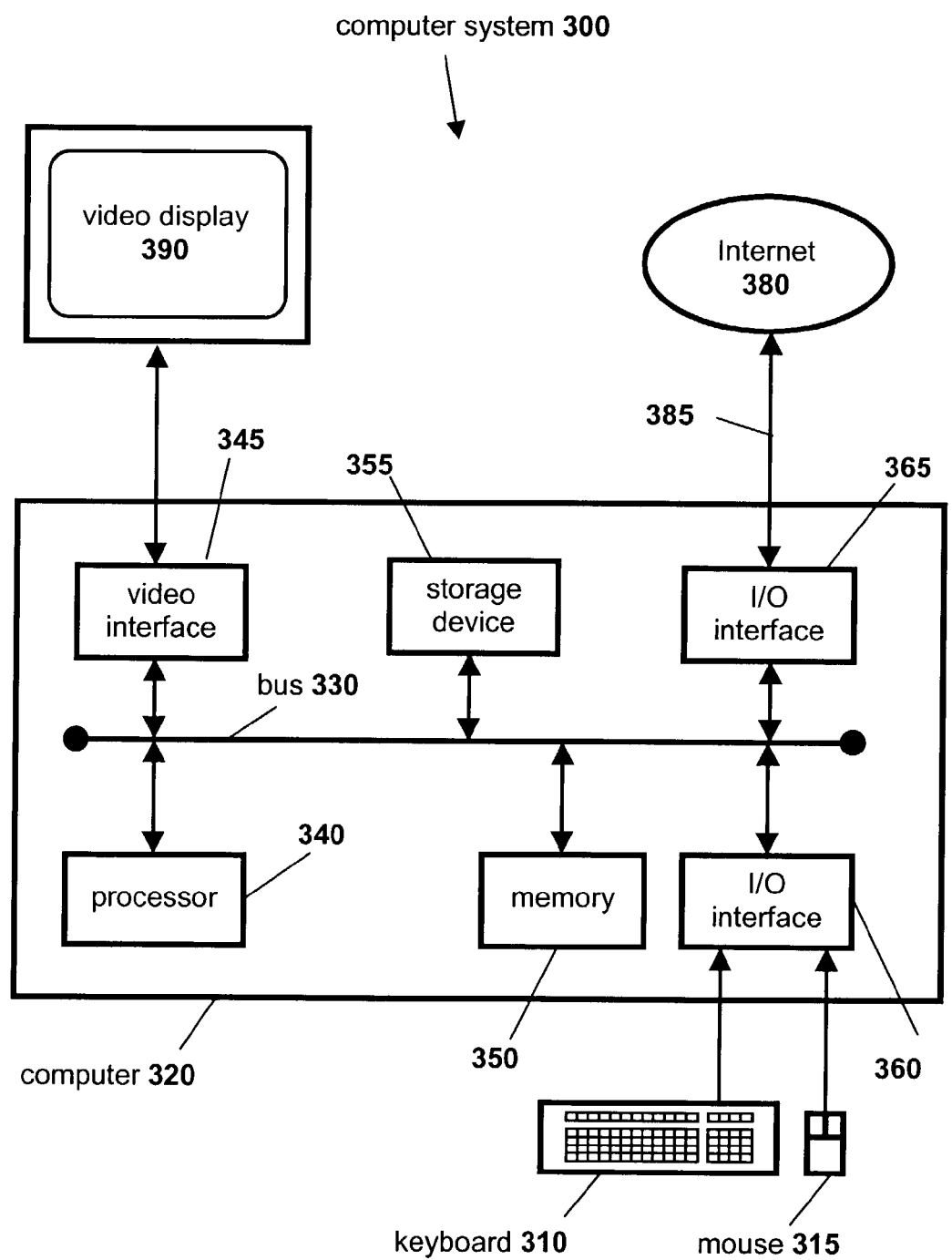
FIG. 3 is a schematic representation of a computer system suitable for performing the techniques described with reference to FIGS. 1 and 2.

FIG. 3 is a schematic representation of a computer system 300 that can be used to implement the techniques described herein. Computer software executes under a suitable is operating system installed on the computer system 300 to assist in performing the described techniques. This computer software is programmed using any suitable computer programming language, and may be considered as comprising various software code means for achieving particular steps.

The components of the computer system 300 include a computer 320, a keyboard 310 and mouse 315, and a video display 390. The computer 320 includes a processor 340, a memory 350, input/output (I/O) interfaces 360, 365, a video interface 345, and a storage device 355.

The processor 340 is a central processing unit (CPU) that executes the operating system and the computer software operating under the operating system. The memory 350 typically includes random access memory (RAM) and read-only memory (ROM), and is used under direction of the processor 340.

The video interface 345 is connected to video display 390 and provides video signals for display on the video display 390 for the benefit of the user. User input to operate the computer 320 is provided from the keyboard 310 and mouse 315. The storage device 355 can include a disk drive or any other suitable storage medium.

Each of the components of the computer 320 is connected to an internal bus 330 that includes data, address, and control buses, to allow components of the computer 320 to communicate with each other via the bus 330.

The computer system 300 can be connected to one or more other similar computers via an input/output (I/O) interface 365 using a communication channel 385 to a network, represented in this case as the Internet 380.

The computer software may be recorded on a portable storage medium, in which case, the computer software program is accessed by the computer system 300 from the storage device 355. Alternatively, the computer software can be accessed directly from the Internet 380 by the computer 320. In either case, a user can interact with the computer system 300 using the keyboard 310 and mouse 315 to operate the programmed computer software executing on the computer 320.

Other configurations or types of computer systems can be equally well used to implement the techniques herein, as is understood by those skilled in the relevant art. The computer system 300 is described only as an example of a particular type of system suitable for implementing the described techniques.

CONCLUSION

A method, computer software, and a computer system are each described herein in the context of generating an interpretable decision tree based upon unlabelled data. Various alterations and modifications can be made to the techniques and arrangements described herein, as would be apparent to one skilled in the relevant art.

We claim:

1. An automated method of performing hierarchical clustering of data for profiling customers generating a set of data records, said method comprising:

inputting unlabeled data records from at least one of a group of customer profile data, text mining data, image categorization data, and video categorization data, said unlabeled data records being retrieved from a storage device, each of said data records representing one of a record and a pattern that do not possess any class labels;

generating an n-ary decision tree from said unlabeled data records, wherein said generating comprises:

creating a list of nodes to be explored, wherein each node comprises a set of attributes pertaining to said set of data records, each of said attributes comprising one of binary, numeric, ordinal and categorical attributes;

for every node in said list, selecting a particular attribute from a set of attributes pertaining to a first node in which information loss is at a maximum when said particular attribute is deleted from said set of attributes, wherein said information loss is measured in terms of loss of inhomogeneity of said set of data records available to said node by a relationship between a distance between two data values in a data set of each node and a maximum distance between a pair of data values in said data set of each node;

determining whether said inhomogeneity at each node exceeds a first predetermined threshold value, then segmenting said set of data records at said first node based on a selected attribute if said inhomogeneity at said first node exceeds a first predetermined threshold value to produce at least one segmented set of data records, wherein said segmenting is based on a single attribute and is performed using any of valley detection, k-means, and leader clustering;

creating child nodes for said first node;

assigning each said segmented set of data records to exactly one child node of said first node; and allocating each said child node a set of attributes comprising attributes available in a parent node of a particular child node minus said selected attribute used to perform said segmenting of said set of data records;

outputting to a user said n-ary generated decision tree on a video display; and using said n-ary generated decision tree to generate a subset of said previously unlabeled data records comprising homogeneous characteristics for said at least one from said group of customer profile data, text mining data, image categorization data and video categorization data, respectively.

2. The method according to claim 1, wherein said segmenting comprises determining whether said particular attribute is any of nominal and numerical.

3. The method according to claim 1, wherein said inhomogeneity with respect to said particular attribute is measured by any one of information theoretic measures, probabilistic measures, uncertainty measures, and fuzzy set theoretic measures.

4. A program storage device readable by machine embodying a program of instructions executable by said machine to perform an automated method of performing hierarchical clustering of data for profiling customers generating a set of data records, said method comprising:

inputting unlabeled data records from at least one of a group of customer profile data, text mining data, image categorization data, and video categorization data, said unlabeled data records being retrieve from the storage device, each of said data records representing one of a record and a pattern that do not possess any class labels;

generating an n-ary decision tree from said unlabeled data records, wherein said generating comprises:

creating a list of nodes to be explored, wherein each node comprises a set of attributes pertaining to said set of data records, each of said attributes comprising one of binary, numeric, ordinal and categorical attributes;

for every node in said list, selecting a particular attribute from a set of attributes pertaining to a first node in which information loss is at a maximum when said particular attribute is deleted from said set of attributes, wherein said information loss is measured in terms of loss of inhomogeneity of said set of data records available to said node by a relationship between a distance between two data values in a data set of each node and a maximum distance between a pair of data values in said data set of each node;

determining whether said inhomogeneity at each node exceeds a first predetermined threshold value, then segmenting said set of data records at said first node based on a selected attribute if said inhomogeneity at said first node exceeds a first predetermined threshold value to produce at least one segmented set of data records, wherein said segmenting is based on a single attribute and is performed using any of valley detection, k-means, and leader clustering;

creating child nodes for said first node;

assigning each said segmented set of data records to exactly one child node of said first node; and allocating each said child node a set of attributes comprising attributes available in a parent node of a particular child node minus said selected attribute used to perform said segmenting of said set of data records;

outputting to a user said n-ary generated decision tree on a video display; and using said n-ary generated decision tree to generate a subset of said previously unlabeled data records comprising homogeneous characteristics for said at least one from said group of customer profile data, text mining data, image categorization data and video categorization data, respectively.

5. The program storage device according to claim 4, wherein said segmenting comprises determining whether said particular attribute is any of nominal and numerical.

6. The program storage device according to claim 4, wherein said inhomogeneity with respect to said particular attribute is measured by any one of information theoretic measures, probabilistic measures, uncertainty measures, and fuzzy set theoretic measures.

7. A computer system for performing hierarchical clustering of data for profiling customers generating a set of data records, said computer system comprising a computer operating system installed on said computer system, wherein said computer operating system is adapted to execute a computer software program adapted to:

input unlabeled data records from at least one of a group of customer profile data, text mining data, image categorization data, and video categorization data, said unlabeled data records being retrieved from a storage device, each of said data records representing one of a record and a pattern that do not possess any class labels;

generate an n-ary decision tree from said unlabeled data records, wherein the generating comprises:

creating a list of nodes to be explored, wherein each node comprises a set of attributes pertaining to said set of data records, each of said attributes comprising one of binary, numeric, ordinal and categorical attributes;

for every node in said list, selecting a particular attribute from a set of attributes pertaining to a first node in which information loss is at a maximum when said particular attribute is deleted from said set of attributes, wherein said information loss is measured in terms of loss of inhomogeneity of said set of data records available to said node by a relationship between a distance between two data values in a data set of each node and a maximum distance between a pair of data values in said data set of each node;

determining whether said inhomogeneity at each node exceeds a first predetermined threshold value, then segmenting said set of data records at said first node based on a selected attribute if said inhomogeneity at said first node exceeds a first predetermined threshold value to produce at least one segmented set of data records, wherein said segmenting is based on a single attribute and is performed using any of valley detection, k-means, and leader clustering;

creating child nodes for said first node;

assigning each said segmented set of data records to exactly one child node of said first node; and allocating each said child node a set of attributes comprising attributes available in a parent node of a particular child node minus said selected attribute used to perform said segmenting of said set of data records;

outputting to a user said n-ary generated decision tree on a video display; and use said n-ary generated decision tree to generate a subset of said previously unlabeled data records comprising homogeneous characteristics for said at least one from said group of customer profile data, text mining data, image categorization data and video categorization data, respectively.

8. The computer system according to claim 7, wherein said segmenting comprises determining whether said particular attribute is any of nominal and numerical.

9. The computer system according to claim 7, wherein said inhomogeneity with respect to said particular attribute is measured by any one of information theoretic measures, probabilistic measures, uncertainty measures, and fuzzy set theoretic measures.

* * * * *